(12) United States Patent
Wen et al.

(10) Patent No.: US 6,754,365 B1
(45) Date of Patent: Jun. 22, 2004

(54) DETECTING EMBEDDED INFORMATION IN IMAGES

(75) Inventors: Xin Wen, Rochester, NY (US); Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/505,327

(22) Filed: Feb. 16, 2000

(51) Int. Cl.[7] .............................................. G06K 9/00
(52) U.S. Cl. ...................................... 382/100; 382/378
(58) Field of Search ................................ 382/100, 232, 382/278; 713/176; 380/210, 252, 287

(56) References Cited

U.S. PATENT DOCUMENTS

| | | | | |
|---|---|---|---|---|
| 5,636,292 A | | 6/1997 | Rhoads | 382/232 |
| 5,859,920 A | | 1/1999 | Daly et al. | 382/115 |
| 5,930,377 A | * | 7/1999 | Powell et al. | 382/100 |
| 6,263,086 B1 | * | 7/2001 | Wang | 382/100 |
| 6,301,360 B1 | * | 10/2001 | Bocionek et al. | 380/28 |
| 6,301,663 B1 | * | 10/2001 | Kato et al. | 713/176 |
| 6,415,040 B1 | * | 7/2002 | Linnartz et al. | 382/100 |
| 6,425,081 B1 | * | 7/2002 | Iwamura | 713/176 |
| 6,456,724 B1 | * | 9/2002 | Watanabe | 382/100 |

OTHER PUBLICATIONS van Schyndel et al., "Key Independent Watermark Detection", Proc. IEEE Int. Conf. on Multimedia Computing and Systems, Jun. 7–11, 1999, pp. 580–585.*

* cited by examiner

Primary Examiner—Leo Boudreau
Assistant Examiner—Ryan J. Miller
(74) Attorney, Agent, or Firm—Peyton C. Watkins

(57) ABSTRACT

A method of detecting an embedded message in a digital image, the embedded message being embedded in periodic blocks in the image, including the steps of: selecting a first area in the digital image; selecting a second area in the digital image; performing a correlation between the first and the second image areas; and if the correlation exceeds an predetermined threshold value at at least one pixel location, producing a signal indicating the existence of embedded message in the digital image.

49 Claims, 2 Drawing Sheets

DETECTING EMBEDDED INFORMATION IN IMAGES

FIELD OF THE INVENTION

The invention relates generally to the field of image processing, and in particular to detecting hidden messages embedded in digital images or printed images. This field is also referred to as data hiding, data embedding, information hiding, watermarking and also steganography.

BACKGROUND OF THE INVENTION

U.S. Pat. No. 6,044,156, issued Mar. 28, 2000, entitled "Method For Generating An Improved Carrier For Use In An Image Data Embedding Application," by Honsinger et al., discloses a technique for embedding messages in digital images data. This method for embedding a hidden message into a digitized image includes the steps of: forming a digitized version of the desired message; generating a random phase carrier; convolving the digitized version of the desired message and the random phase carrier to form a dispersed message; and combining the dispersed message with the digitized image to form an image with an embedded hidden message. Hidden messages may be embedded in photographic images recorded on film and paper using conventional photographic printing techniques, or they may be embedded in images produced on printers such as ink jet and thermal dye transfer printers, by combining the dispersed message with a digital image using digital image processing techniques. The hidden or embedded information can include copyright or proprietor information or other information associated with the digital image.

The hidden messages are recovered from the image by cross correlating the image containing the dispersed message with a decoding carrier to recover the embedded dispersed message and extracting the digital message data from the recovered dispersed message.

Several embedding software can be used for embedding messages in digital images, for example, the techniques disclosed in U.S. Pat. No. 5,636,292, issued Jun. 3, 1997, to Rhoads, entitled "Steganography Methods Employing Embedded Calibration Data," and U.S. Pat. No. 5,859,920, issued Jan. 12, 1999 to Daly et al., and entitled "Method for Embedding Digital Information in an Image." The extraction of information embedded using different manufacturers requires keys produced by these manufacturers. A problem thus exists if not all the keys are available at an imaging device—if the embedded information relates to a copyright in the image, the copyright information on some digital images cannot be detected. There is therefore a need to detect the existence of embedded messages in a digital image produced by any manufacturer's embedding software, regardless of the source of the embedded software.

SUMMARY OF THE INVENTION

The above noted need is met according to the present invention by providing a method of detecting an embedded message in a digital image, the embedded message being embedded in periodic blocks in the image, that includes the steps of: selecting a first area in the digital image; selecting a second area in the digital image; performing a correlation between the first and the second image areas; and if the correlation exceeds an predetermined threshold value at at least one pixel location, producing a signal indicating the existence of embedded message in the digital image.

An advantage of the present invention is that existence of messages embedded in digital images can be detected. Proper warning and measures can be taken for protecting the potential copyright of the digital images.

Another advantage of the present invention is that the present invention can detect the existence of embedded messages produced by different manufacturers' software.

DETAILED DESCRIPTION OF THE INVENTION

The present invention provides a method for detecting the existence of embedded messages in a digital image. The digital image can be produced for example by scanning a photographic image in an image scanner and digitizing the signal produced by the scanner. Such messages can be embedded by different embedding methods developed by different manufacturers, the only feature that needs to be in common is that the message is embedded in periodic blocks within the image. The present invention takes advantage of the fact that many message-embedding was performed in periodic blocks or tiles in the digital image. The detection of periodic signals is used as an indication for the existence of embedded information in the digital image.

As described above, the present invention is compatible with many different embedding methods as long as the message is embedded using periodic blocks or tiles. One embedding method is discussed below as an example of these embedding methods, however it will be understood that the method of the present invention can be used to detect any message that is embedded using periodic blocks.

Figure 1:
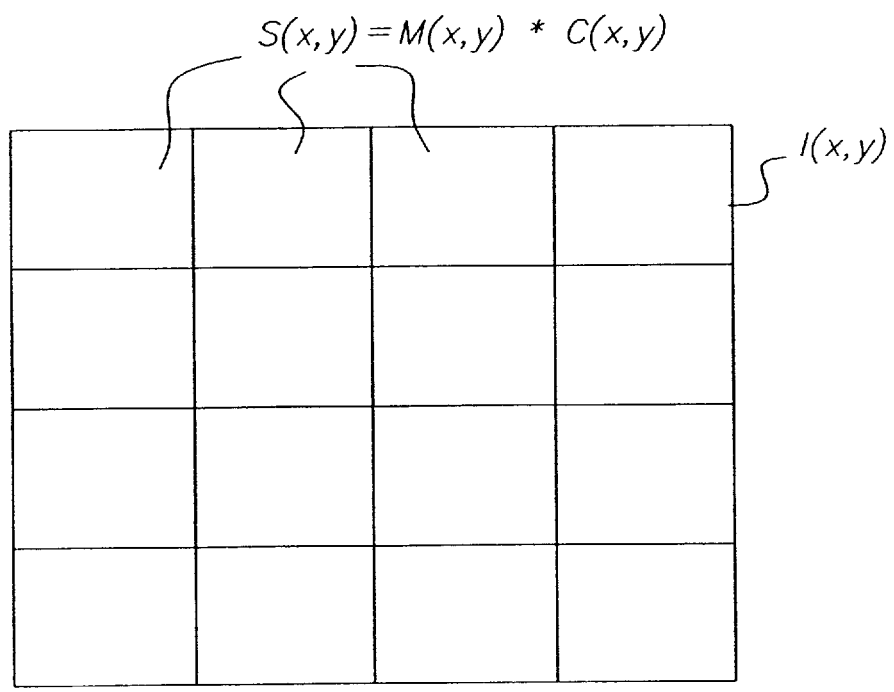
FIG. 1 illustrates a digital image I'(x,y) having a plurality of dispersed images S(x,y) having embedded information.

Referring to FIG. 1, the embedding starts with a digital image I(x,y), a message image M(x,y), and a carrier image C(x,y). The message image M(x,y) can include alpha numeric or graphic image objects. The carrier image C(x,y) is preferably a random-phase image that is characterized by pixel values randomly distributed in different pixel locations. Details about the carrier image C(x,y) are disclosed in the U.S. patent application Ser. No. 08/848,112, filed Apr. 28, 1997 and allowed Sep. 23, 1999, by Honsinger et al., which is incorporated herein by reference.

The message image M(x,y) and the carrier image C(x,y) are then convolved to form a dispersed message S(x,y), $$S(x,Y)=M(x,Y)*C(x,Y) \qquad (1)$$

where "*" denotes a convolution operation. The preferred form of the convolution operation is circular convolution as described in "Digital Signal Processing" by Alan V. Oppenheim and Ronald W. Schafer, Prentice-Hall, Inc., pages 101–115, which can be efficiently performed in either the space domain (image domain) or the Fourier frequency domain.

Finally, the dispersed message S(x,y) is added, pixel by pixel, to the input digital image I(x,y), in a block or tile wise fashion to produce the digital image I'(x,y) having the embedded dispersed message:

$$I'(x, y) = I(x, y) + \sum_{i,j} Sij(x, y) \quad (2)$$

wherein the indices (i, j) are integers denoting the two dimensional coordinates of the digital image. The blocks of the dispersed message $S_{ij}(x,y)$'s are distributed in a spatially periodic fashion, that is, the dispersed messages is repeated periodically in both dimensions of the digital image I'(x,y).

Although rectangular shapes are shown in FIG. 1, for each block of the dispersed image S(x,y), the dispersed image S(x,y) can exist in many different shapes such as square, triangular, hexagon, or irregular shapes, that can repeat themselves in a periodic fashion in two dimensions.

Figure 2:
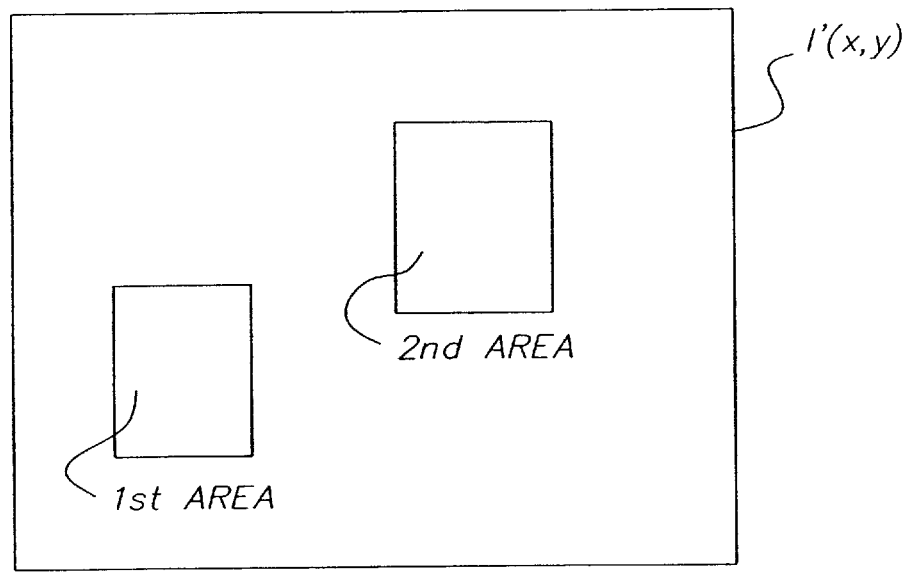
FIG. 2 illustrates the selection of image areas in a digital image I'(x,y) for detecting the existence of an embedded message in the digital image in accordance with the present invention.
Figure 3:
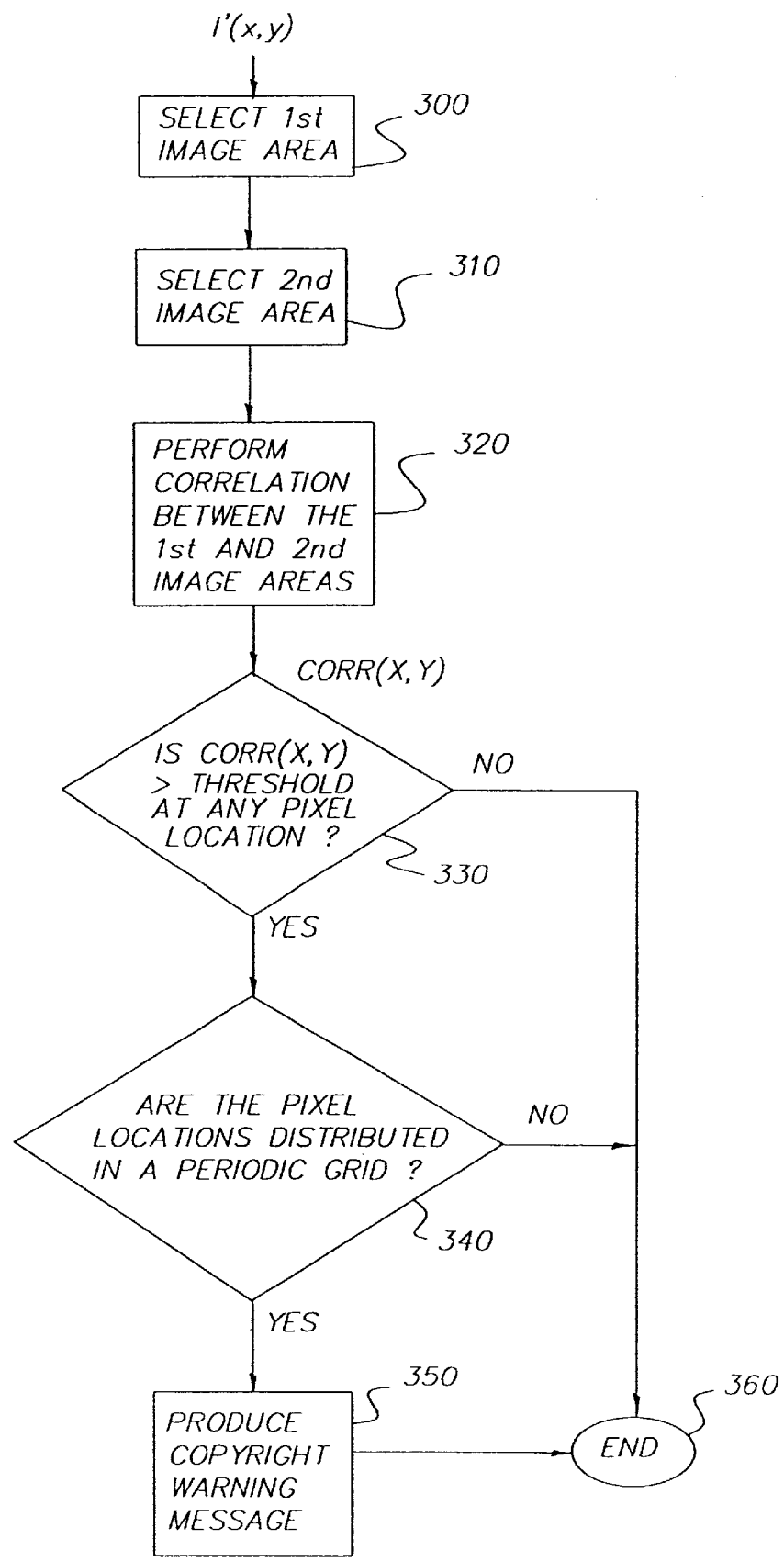
FIG. 3 is a flow chart illustrating the method of the present invention.

The present invention uses the periodic nature of the dispersed image in I'(x,y), used by many embedding programs, for detecting the existence of such embedded information. As shown in FIG. 2 and FIG. 3, the detection process starts with selecting a first image area and a second image in the digital image that potentially contains embedded information (boxes 300, 310). The first and the second image areas can be from different portions of the image or can be from the identical areas. Alternatively, the first and the second image areas might be selected from different digital images received from the same image source, since they may carry the same embedded message.

Next, a correlation is performed between the two image areas in box 320. Preferably the correlation is performed in two dimensions as shown in Equation (3) below. If the two image areas are selected from the same area, this operation is simply an autocorrelation. If the digital image I'(x,y) contains information embedded as described in Equation (1). Then we have $$I'(x, y) * I'(x, y) = \left(I(x, y) + \sum_{i,j} Sij(x, y)\right) * \left(I(x, y) + \sum_{i,j} Sij(x, y)\right) = \sum_{i,j} Aij\delta(x - ia - p, y - jb - q)) + \text{background noise} \quad (3)$$

The correlation is characterized by a plurality of delta-function peaks that are distributed in a periodic one-dimensional or two-dimensional array. The parameters a, and b are periods of the array along each image dimension; p and q are the offsets; Aij's are the amplitude of the delta-function peaks, that are related to the amplitude or strength of the embedding signal. The background noise is dependent on the source image I(x,y). Due to the background noise, a threshold value needs to be set for a positive detection of the delta-function peaks. In the present invention, the typical threshold is set at 3 times the root-mean square of the background noise.

The digital image to be examined may be scanned and digitized from an image on a receiver. In such a situation, the delta-function peaks will likely suffer a certain degree of a degradation such as broadening of the peak and reduction in the peak height. In accordance with the present invention, all these peaks are referred to as delta function peaks. Their validity is determined by comparing to the threshold values.

In box 330, a question is asked whether there is any pixel location at which the correlation is above the threshold. If such pixel locations are not found, embedded information is not detected and the detection ends in box 360. If there are plurality of pixel locations having correlation values above threshold, these pixel locations are determined in box 340 whether they are distributed in a periodic array. If they are not, the detection is not confirmed and ends in box 360. This assures that there is no false detection in the embedded signal. If the pixel locations are distributed in a periodic array, they are consistent with the properties as described in Equation (3). Embedded signal is confirmed to exist in the digital image. A signal is produced indicating that copyright or other information is embedded in such an image. Alternatively, the signal indicating the existence of an embedded message can be produced if the correlation exceeds the predetermined threshold at at least one pixel location.

The detection method may be performed by a programmed computer. Properties that characterize the specific features of the embedding programs from different manufacturers can be stored on the computer where the detection program is run. For example, the periods (a and b in Equation (3)) are typically different for different manufacturers. The periods in one of the one-dimensional or two-dimensional arrays are in the range of 16 to 2048 pixels. If the digital image I'(x,y) is scanned from an image on a receiver, the periods in of the one-dimensional or the two-dimensional array correspond to 0.05 inch to 5 inch on the receiver. In addition, the amplitudes Aij's of the delta function peaks are often different for different manufacturers. These pre-stored properties can be used to provide indications to the source of the embedding programs, that is, which manufacturer's program is used to embed the message. After the existence of an embedded message is detected, the periods (a and b) and the amplitudes Aij's are compared to the pre-stored properties. If the properties match with a manufacturer's profile, an electronic message can be sent to an electronic address for that specific manufacturer to notify the detection of the embedded message. The detection of the embedded message signal can be used to generate a warning that indicates that the image may be copyright protected. The use of the digital image can be restricted unless proper authorization is provided. Details of such authorization is disclosed in U.S. Ser. No. 09/491,811, filed Jan. 28, 2000, by Wen et al., and entitled "Authorizing the Production of Visual Images from Digital Images." The detection program, the pre-stored properties, and programs for managing authorization of image use are stored on a computer connected to an imaging device or within an imaging device. An imaging device can be a kiosk, a printer, a display, a printer and the like that all can produce visual images and/or process digital images. Users can view or produce the images in the form of an imaging service. The notification and authorization can all be communicated over the Internet and managed by a service provider or the manufacturer itself.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

What is claimed is:

1. A method of detecting an embedded message in a digital image, the embedded message being embedded in periodic blocks in the image, the method comprising the steps of:
   a) providing a plurality of stored properties from different manufacturers;
   b) selecting a first area in the digital image;
   c) selecting a second area in the digital image;
   d) performing a correlation between the first and the second image areas; and
   e) if the correlation exceeds a predetermined threshold value at at least one pixel location, measuring a property of the embedded image and comparing the measured property to at least one of the stored properties, and, if the measured property is the same as the stored property, producing a signal indicating the existence of the embedded message within the digital image.

2. The method of claim 1 wherein the correlation between the first image and the second image areas is performed in two-dimensions; and wherein the second area in the digital image is different than the first image area, and the correlation of step d) is not an autocorrelation.

3. The method of claim 1 wherein a same area is selected for the first and the second image areas in the digital image, thereby providing an autocorrelation of the area.

4. The method of claim 1 wherein there are at least two digital images and the first image and the second image areas are selected from the two different digital images.

5. The method of claim 1 wherein the signal is produced when the correlation exceeds the predetermined threshold value at a plurality of pixel locations.

6. The method of claim 5 wherein the plurality of pixel locations are distributed in a one-dimensional or a two-dimensional array.

7. The method of claim 6 wherein when the correlation does not exceed the predetermined threshold value at at least one pixel location, no embedded message is detected and detection ends.

8. The method of claim 1 wherein the digital image is scanned and digitized by a scanner from an image printed on a receiver.

9. The method of claim 8 wherein the correlation exceeds the predetermined threshold value at a plurality of locations and such plurality of locations are distributed in a one-dimensional or a two-dimensional array.

10. The method of claim 9 wherein in step d), where the correlation exceeds a predetermined threshold value at a plurality of the pixel locations, detecting whether these pixel locations are distributed in a periodic array, and, if they are not, ending the method.

11. The method of claim 1 wherein the signal is employed to generate a warning that the image may be copyright protected.

12. The method of claim 1 wherein the signal is used to restrict the use of the digital image without proof of proper authorization.

13. The method of claim 1 further including the step of sending a notification to a copyright holder requesting permission for the use of copyright images.

14. The method of claim 13 wherein the step of sending the message to the copyright holder includes sending the message to an electronic address associated with the copyright holder.

15. The method of claim 13 wherein the step of sending the message to the copyright holder includes pre-storing properties of the correlation functions from different manufacturers, determining the manufacturer whose embedding software produced the embedded message using the pre-stored properties, and sending the message to the manufacturer.

16. The method of claim 1, wherein the method is practiced in a computer.

17. An apparatus for detecting an embedded message in a digital image, the embedded message being embedded in periodic blocks in the image, the apparatus comprising:
   a) means for selecting a first area in the digital image;
   b) means for selecting a second area in the digital image;
   c) means for performing a correlation between the first and the second image areas;
   d) means for storing a plurality of properties from different manufacturers and
   e) means responsive to the correlation exceeding a predetermined threshold value at at least one pixel location measuring a property of the embedded image and comparing the measured property to at least one of the plurality of properties, and, if the measured property is the same as the at least one of the plurality of properties, for producing a signal indicating the existence of the embedded message in the digital image.

18. A method of detecting an embedded message in a digital image, the embedded message being embedded in periodic blocks in the image, comprising the steps of:
   a) selecting a first area in the digital image;
   b) selecting a second area in the digital image;
   c) performing a correlation between the first and the second image areas; and
   d) if the correlation exceeds a predetermined threshold value at at least one pixel location, measuring a property of the embedded image and comparing the measured property to at least one stored property selected from a plurality of pre-stored properties from more than one manufacturer, and, if the measured property is the same as the stored property, producing a signal indicating the existence of the embedded message in the digital image.

19. The method of claim 18 wherein the property is correlation amplitude.

20. The method of claim 18 wherein a same area is selected for the first and the second image areas in the digital image, thereby providing an autocorrelation of the area.

21. The method of claim 18 wherein the property is periodicity.

22. The method of claim 18 wherein the signal is produced when the correlation exceeds the predetermined threshold value at a plurality of pixel locations.

23. The method of claim 22 wherein the plurality of pixel locations are distributed in a one-dimensional or a two-dimensional array.

24. The method of claim 23 wherein the periods in of the one-dimensional or two-dimensional array are in the range of 16 to 2048 pixels.

25. The method of claim 18 wherein the digital image is scanned and digitized by a scanner from an image printed on a receiver.

26. The method of claim 25 wherein the correlation exceeds the predetermined threshold value at a plurality of locations and such plurality of locations are distributed in a one-dimensional or a two-dimensional array.

27. The method of claim 26 wherein the periods in of the one-dimensional or the two-dimensional array correspond to 0.05 inch to 5 inch on the receiver.

28. The method of claim 18 wherein the signal is employed to generate a warning that the image may be copyright protected.

29. The method of claim 18 wherein the signal is used to restrict the use of the digital image without proof of proper authorization.

30. The method of claim 18 further including the step of sending a notification to a copyright holder requesting permission for the use of copyright images.

31. The method of claim 30 wherein the step of sending the message to the copyright holder includes sending the message to an electronic address associated with the copyright holder.

32. The method of claim 30 wherein the step of sending the message to the copyright holder includes pre-storing properties of the correlation functions from different manufacturers, determining the manufacturer whose embedding software produced the embedded message using the pre-stored properties, and sending the message to the manufacturer.

33. A computer readable storage medium having instructions stored therein for causing a computer to perform the method of claim 18.

34. A method of detecting an embedded message in a digital image, the embedded message being embedded in periodic blocks in the image, the method comprising the steps of:
  a) selecting a first area in the digital image;
  b) selecting a second area in the digital image;
  c) performing a correlation between the first and the second image areas; and
  d) if the correlation exceeds a predetermined threshold value at at least one pixel location, measuring a property of the embedded image and comparing the measured property to at least one stored property selected from a plurality of pre-stored properties having different periodicity values, and, if the measured property is the same as the stored property, producing a signal indicating the existence of the embedded message in the digital image.

35. The method of claim 34 wherein the correlation between the first image and the second image areas is performed in two-dimensions.

36. The method of claim 34 wherein a same area is selected for the first and the second image areas in the digital image, thereby providing an autocorrelation of the area.

37. The method of claim 34 wherein there are at least two digital images and the first image and the second image areas are selected from the two different digital images.

38. The method of claim 34 wherein the signal is produced when the correlation exceeds the predetermined threshold value at a plurality of pixel locations.

39. The method of claim 38 wherein the plurality of pixel locations are distributed in a one-dimensional or a two-dimensional array.

40. The method of claim 39 wherein the periods in of the one-dimensional or two-dimensional array are in the range of 16 to 2048 pixels.

41. The method of claim 34 wherein the digital image is scanned and digitized by a scanner from an image printed on a receiver.

42. The method of claim 41 wherein the correlation exceeds the predetermined threshold value at a plurality of locations and such plurality of locations are distributed in a one-dimensional or a two-dimensional array.

43. The method of claim 42 wherein the periods in of the one-dimensional or the two dimensional array correspond to 0.05 inch to 5 inch on the receiver.

44. The method of claim 34 wherein the signal is employed to generate a warning that the image may be copyright protected.

45. The method of claim 34 wherein the signal is used to restrict the use of the digital image without proof of proper authorization.

46. The method of claim 34 further including the step of sending a notification to a copyright holder requesting permission for the use of copyright images.

47. The method of claim 46 wherein the step of sending the message to the copyright holder includes sending the message to an electronic address associated with the copyright holder.

48. The method of claim 46 wherein the step of sending the message to the copyright holder includes pre-storing properties of the correlation functions from different manufacturers, determining the manufacturer whose embedding software produced the embedded message using the pre-stored properties, and sending the message to the manufacture.

49. A computer readable storage medium having instructions stored therein for causing a computer to perform the method of claim 34.

* * * * *